(12) United States Patent
Shimezawa et al.

(10) Patent No.: US 11,711,141 B2
(45) Date of Patent: Jul. 25, 2023

(54) METHODS AND INFRASTRUCTURE EQUIPMENT

(71) Applicant: Sony Corporation, Tokyo (JP)

(72) Inventors: Kazuyuki Shimezawa, Basingstoke (GB); Samuel Asangbeng Atungsiri, Basingstoke (GB); Yuxin Wei, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/056,002

(22) PCT Filed: May 1, 2019

(86) PCT No.: PCT/EP2019/061162
§ 371 (c)(1),
(2) Date: Nov. 17, 2020

(87) PCT Pub. No.: WO2019/219386
PCT Pub. Date: Nov. 21, 2019

(65) Prior Publication Data
US 2021/0226696 A1 Jul. 22, 2021

(30) Foreign Application Priority Data
May 18, 2018 (EP) .................................... 18173340

(51) Int. Cl.
H04W 72/04 (2023.01)
H04B 7/26 (2006.01)
(Continued)

(52) U.S. Cl.
CPC ....... H04B 7/2606 (2013.01); H04B 7/15542 (2013.01); H04L 5/0035 (2013.01);
(Continued)

(58) Field of Classification Search
None
See application file for complete search history.

(56) References Cited

U.S. PATENT DOCUMENTS

2006/0209671 A1* 9/2006 Khan .................... H04L 5/0044
455/60

FOREIGN PATENT DOCUMENTS

WO 2006/098608 A1 9/2006

OTHER PUBLICATIONS

International Search Report and Written Opinion received for PCT Application No. PCT/EP2019/061162, dated Jun. 13, 2019, 10 pages.

(Continued)

Primary Examiner — Willie J Daniel, Jr.
(74) Attorney, Agent, or Firm — Xsensus LLP

(57) ABSTRACT

A method of operating a first infrastructure equipment of a wireless communications network comprising a core network part, the first infrastructure equipment, a second infrastructure equipment acting as a backhaul relay node between the first infrastructure equipment and the core network part, and a downstream wireless communications device. The method comprising receiving from the second infrastructure equipment an indication of a first set of communications resources, allocating resource elements of the first set of communications resources for receiving first data for transmission to the core network part from the downstream wireless communications device, and receiving second data transmitted by the second infrastructure equipment on one or more resource elements within a second set of communications resources, the second set of communications resources different from the first set of communications resources.

20 Claims, 7 Drawing Sheets

(51) Int. Cl.
  *H04B 7/155* (2006.01)
  *H04L 5/00* (2006.01)
  *H04W 72/0453* (2023.01)
  *H04W 72/20* (2023.01)

(52) U.S. Cl.
  CPC ....... *H04L 5/0092* (2013.01); *H04W 72/0453* (2013.01); *H04W 72/20* (2023.01)

(56) References Cited

OTHER PUBLICATIONS

Alcatel-Lucent, "[70b#15]-LTE: Who determines RN Type/subframe partitioning and how is this communicated", 3GPP TSG-RAN WG2, Meeting No. 71, R2-104541, Aug. 23-27, 2010, Madrid Spain, pp. 1-11.
Motorola, "Relay UL/DL timing discussion", 3GPP TSG RAN WG1, Meeting No. 60, R1-101119, SanFrancisco, USA, Feb. 22-26, 2010, pp. 1-7.
Huawei, "Consideration on RN Type Decision Issue", 3GPP TSG-RAN WG2 Meeting No. 71, R2-104701, Madrid, Spain, Aug. 23-27, 2010, pp. 1-4.
Holma et al., "LTE for UMTS OFDMA and SC-FDMA Based Radio Access", System Architecture Based on 3GPP SAE, 2009, pp. 25-27.
NTT Docomo Inc., "Revised WID on New Radio Access Technology", 3GPP TSG RAN Meeting No. 78, RP-172834 revision of RP-172115, Lisbon, Portugal, Dec. 18-21, 2017, 11 pages.

* cited by examiner

METHODS AND INFRASTRUCTURE EQUIPMENT

CROSS-REFERENCE TO RELATED APPLICATIONS

The present application is based on PCT filing PCT/EP2019/061162, filed May 1, 2019, which claims priority to EP 18173340.3, filed May 18, 2018, the entire contents of each are incorporated herein by reference.

BACKGROUND

Field of Disclosure

The present disclosure relates to methods and apparatus for the allocation of communications resources for the transmission of data on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

As radio technologies continue to improve, for example with the development of 5G ("New Radio"), the possibility arises for these technologies to be used not only by infrastructure equipment to provide service to terminal devices in a cell, but also for interconnecting infrastructure equipment to provide a wireless backhaul.

In view of this there is a need for a suitable means for allocating communications resources for the transmission of data by means of a wireless backhaul.

SUMMARY OF THE DISCLOSURE

The present disclosure can help address or mitigate at least some of the issues discussed above.

Embodiments of the present technique can provide a method of operating a first infrastructure equipment of a wireless communications network, the wireless communications network comprising a core network part, the first infrastructure equipment, a second infrastructure equipment acting as a backhaul relay node between the first infrastructure equipment and the core network part, and a downstream wireless communications device. The method comprises receiving from the second infrastructure equipment an indication of a first set of communications resources, the first set of communications resources comprising one or more resource elements of a first carrier within a first time period, in response to receiving the indication of the first set of communications resources, allocating resource elements of the first set of communications resources for receiving first data for transmission to the core network part from the downstream wireless communications device, and receiving second data transmitted by the second infrastructure equipment on one or more resource elements within a second set of communications resources of the first carrier within the first time period, the second set of communications resources different from the first set of communications resources.

Embodiments of the present technique can enable uplink data and downlink data to be efficiently transmitted between nodes forming a wireless backhaul to a core network part of a wireless communications network and between the nodes forming or making use of the wireless backhaul and terminal devices via a shared access.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Radio Access Technology (4G)

Figure 1:
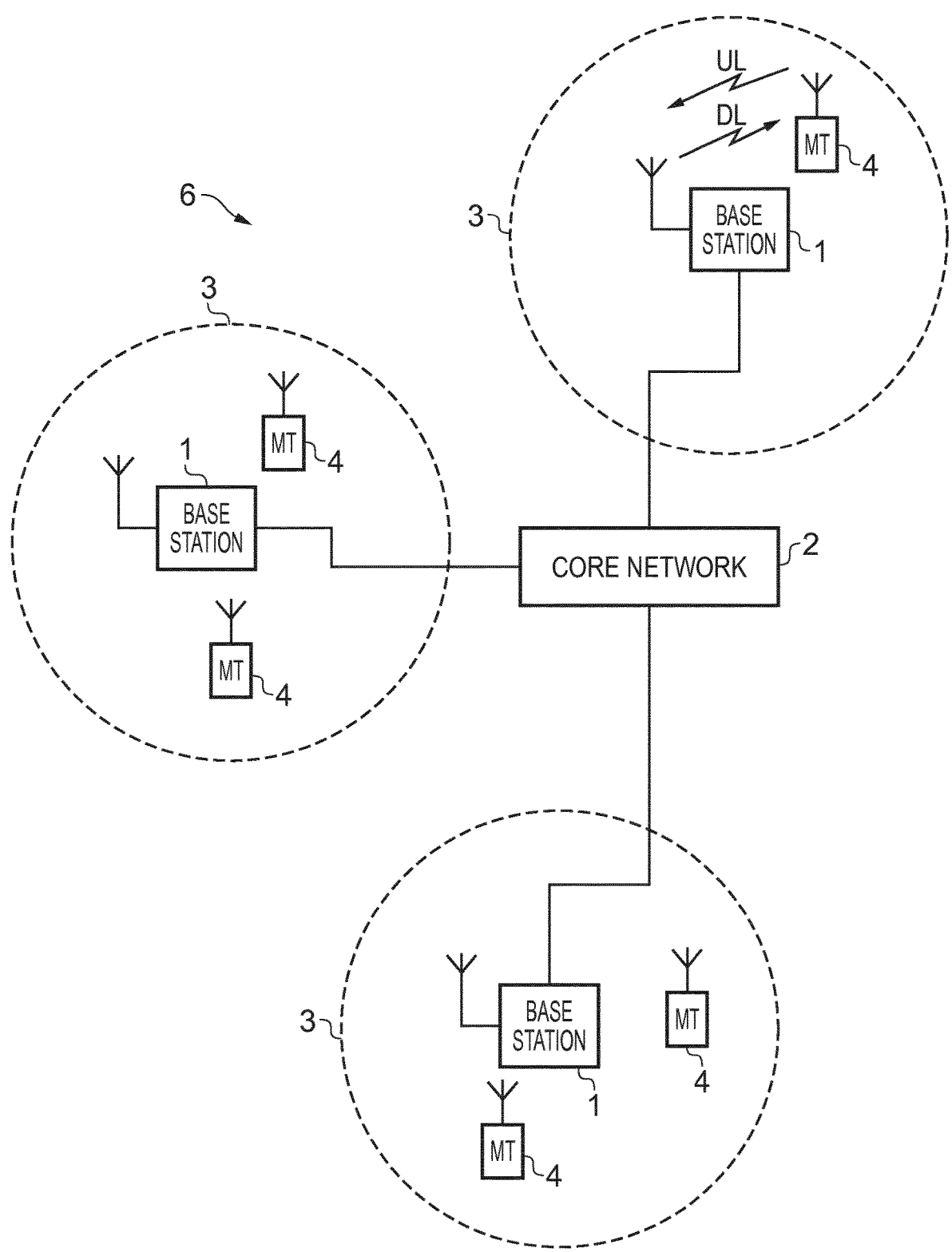
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies including NR (New RAT), and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from terminal devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to terminal devices 4 within their respective coverage areas 3 via a radio downlink Data is transmitted from terminal devices 4 to the base stations 1 via a radio uplink. The core network 2 routes data to and from the terminal devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the terminal devices 4 so that it can efficiently contact (i.e. page) the terminal devices 4 for transmitting downlink data towards the terminal devices 4.

Base stations, which are an example of network infrastructure equipment, may also be referred to as transceiver stations, nodeBs, eNodeBs, eNB, gNodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (NR) (5G)

Figure 2:
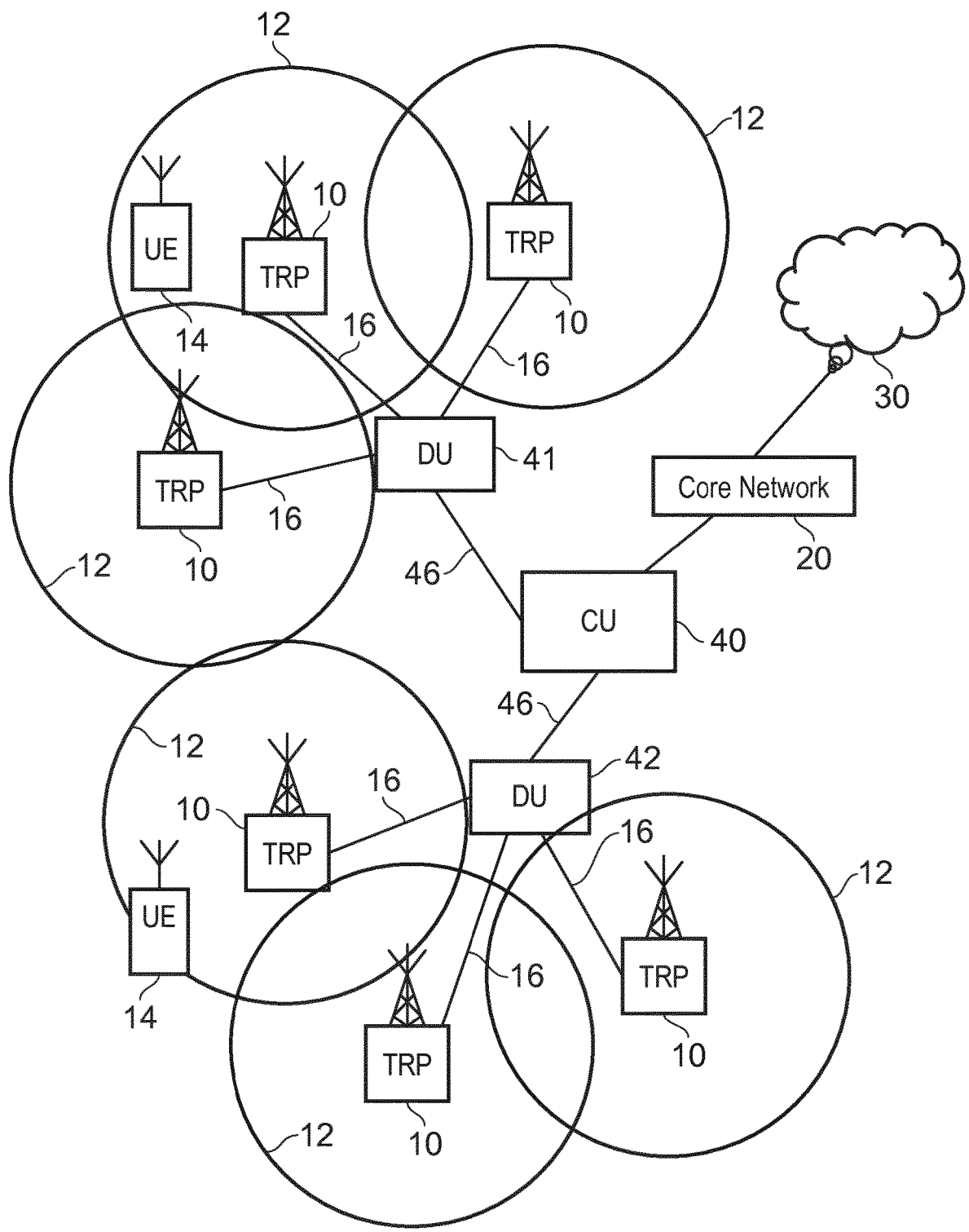
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a line 12. The TRP in FIG. 2 may be a base station, gNodeB (gNB). As such terminal devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the terminal devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the terminal devices 14 may have a functionality corresponding to the UE devices 4 known for operation with an LTE network. It will be appreciated therefore that operational aspects of a NR (New RAT) network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/central unit and/or the distributed units/TRPs. A terminal device 14 is represented in FIG. 2 within the coverage area of the first communication cell 12. This terminal device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
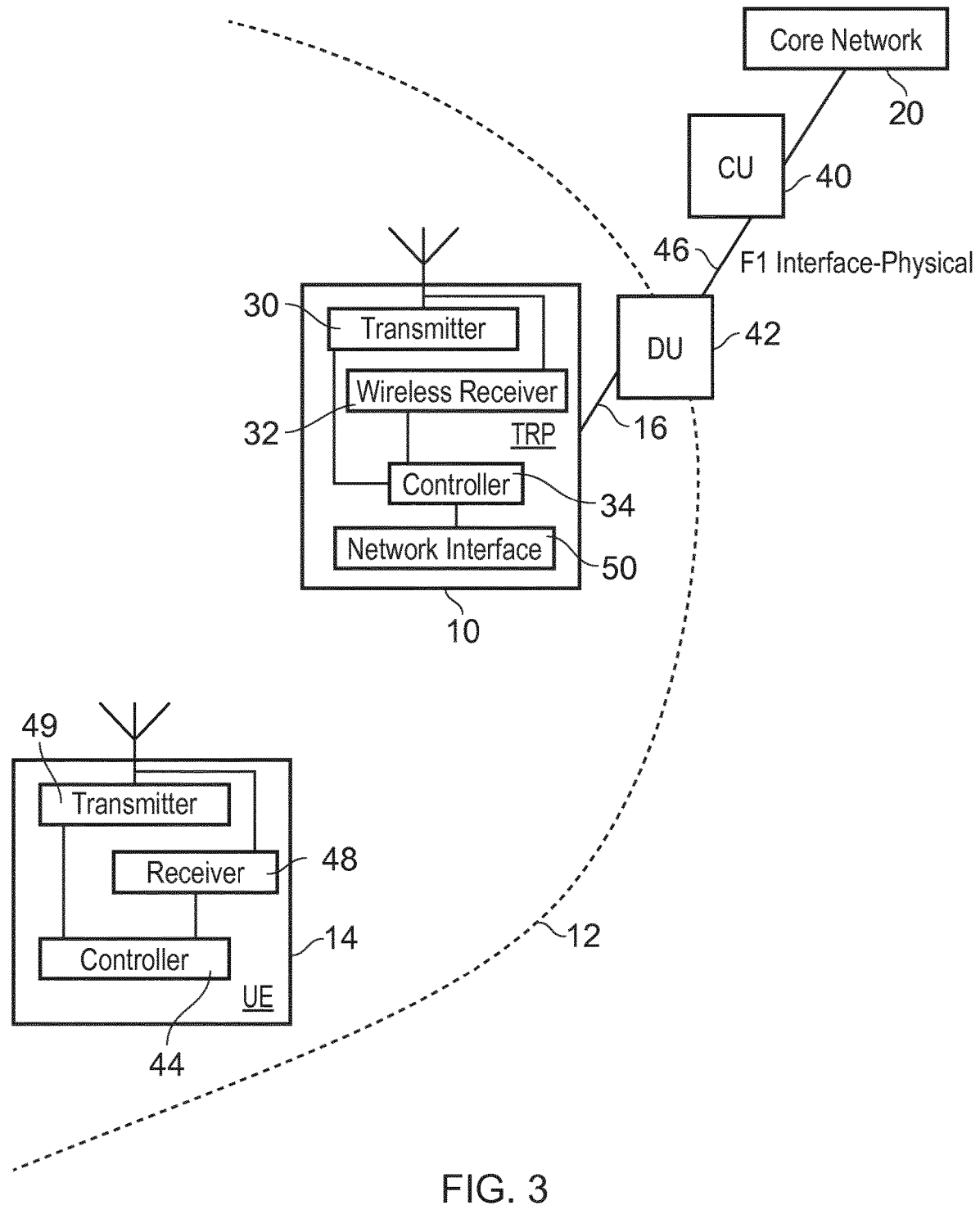
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3 a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation. The transmitters 30, 49 and the receivers 32, 48 may include radio frequency filters and amplifiers as well as signal processing components and devices in order to transmit and receive radio signals in accordance for example with the 5G standard.

The controllers 34, 44 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3 the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection to the core network can be generally referred to as a backhaul comprising the interface 16 from the network interface 50 of the TRP 10 to the DU 42 and the F1 interface 46 from the DU 42 to the CU 40.

Figure 4:
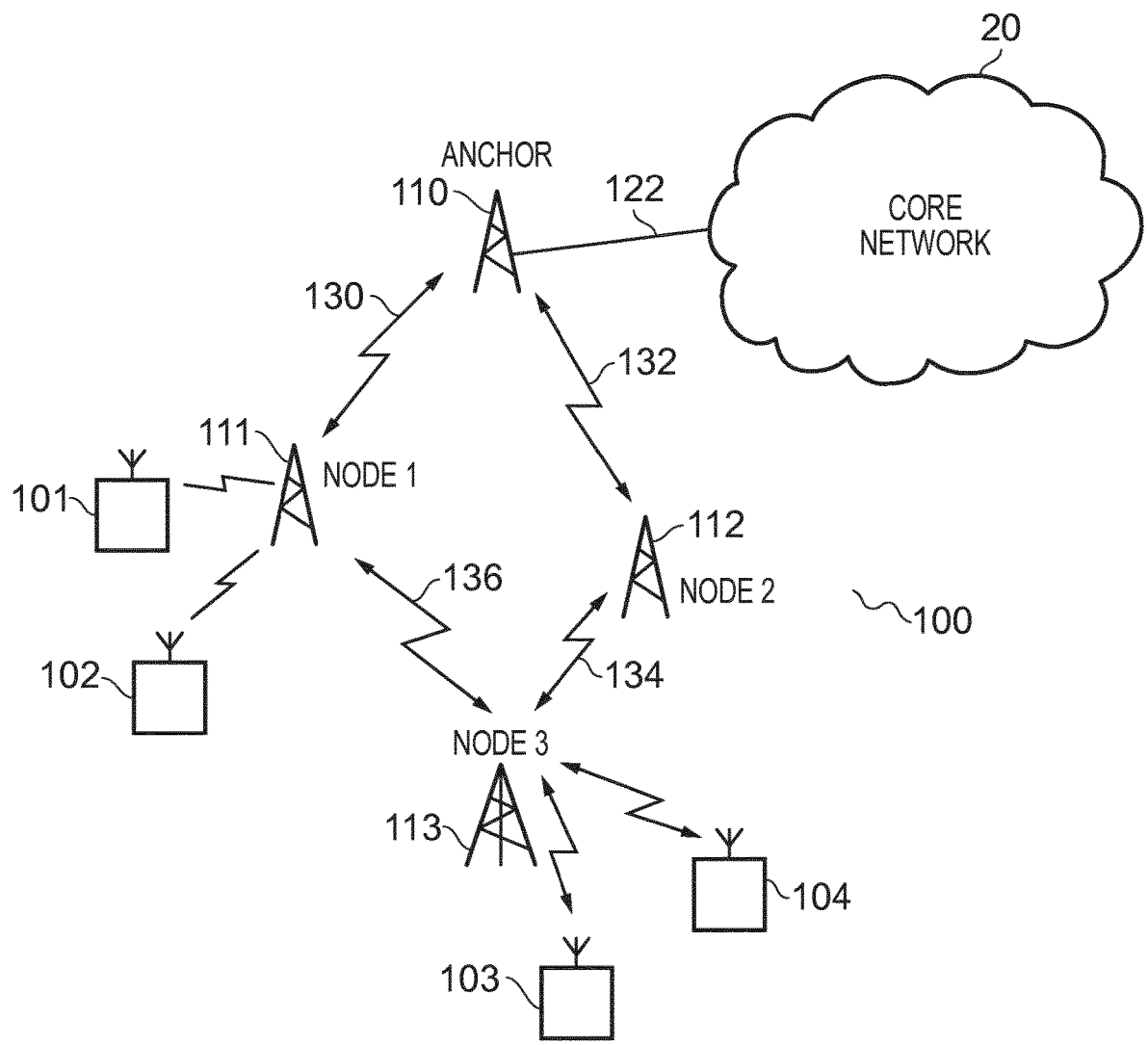
FIG. 4 schematically represents some aspects of a wireless telecommunication network which may be configured to operate in accordance with certain embodiments of the present disclosure.

Example embodiments of the present technique which can be formed from a wireless communications network corresponding to that shown in FIG. 1 or 2 is shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth terminal device (respectively 101, 102, 103 and 104) which may broadly correspond to the terminal devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the terminal devices 101-104. For example, the fourth infrastructure equipment 113 provides a cell in which the third and fourth terminal devices 103 and 104 may obtain service. Data is transmitted from the fourth infrastructure equipment 113 to the fourth terminal device 104 within its respective coverage area (not shown) via a radio downlink Data is transmitted from the fourth terminal device 104 to the fourth infrastructure equipment 113 via a radio uplink.

The infrastructure equipment 110-113 in FIG. 4 may correspond broadly to the TRPs 10 of FIG. 2 and FIG. 3 or to base stations or gNodeBs.

The first infrastructure equipment 110 in FIG. 4 is connected to the core network 20 by means of one or a sequence of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there may be no physical connection between any of the second infrastructure equipment 111, the third infrastructure equipment 112, and the fourth infrastructure equipment 113 and the core network 20. As such, it may be necessary (or, otherwise determined to be appropriate) for data received from a terminal device (i.e. uplink data), or data for transmission to a terminal device (i.e. downlink data) to be transmitted to or from the core network 20 via infrastructure equipment (such as the first infrastructure equipment 110) which has a physical connection to the core network 20, even if the terminal device is not currently served by the first infrastructure equipment 110 but is, for example, in the case of the terminal device 104, served by the fourth infrastructure equipment 113.

The second, third and fourth infrastructure equipment 111-113 in FIG. 4 may each comprise a TRP, broadly similar in functionality to the TRPs 10 of FIG. 2 or a base station or a gNodeB.

In some embodiments of the present technique, one or more of the second to fourth infrastructure equipment 111-113 in FIG. 4 may further comprise a DU 42, and in some embodiments of the present technique, one or more of the second to fourth infrastructure equipment 110-113 may comprise a DU and a CU.

In some embodiments of the present technique, the CU 40 associated with the first infrastructure equipment 110 may perform the function of a CU not only in respect of the first infrastructure equipment 110, but also in respect of one or more of the second, the third and the fourth infrastructure equipment 111-113.

In order to provide the transmission of the uplink data or the downlink data between a terminal device and the core network, a route is determined by any suitable means, with one end of the route being an infrastructure equipment physically connected to a core network and by which uplink and downlink traffic is routed to or from the core network.

In the following, the term 'node' is used to refer to an entity which forms a part of a route for the transmission of the uplink data or the downlink data.

An infrastructure equipment which is physically connected to the core network and operated in accordance with an example embodiment may provide communications resources to other infrastructure equipment and so is referred to as a 'donor node'. An infrastructure equipment which acts as an intermediate node (i.e. one which forms a part of the route but is not acting as a donor node) is referred to as a 'relay node'. The relay node at the end of the route which is the infrastructure equipment controlling the cell in which the terminal device is obtaining service is referred to as an 'end node'.

In the wireless network illustrated in FIG. 4, each of the first to fourth infrastructure equipment 110-113 may therefore function as nodes. For example, a route for the transmission of uplink data from the fourth terminal device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity in the following description, the infrastructure equipment 110 is referred to below as the 'donor node', the first infrastructure equipment 111 is referred to below as 'Node 1', the second infrastructure equipment 112 is referred to below as 'Node 2' and the third infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a terminal device to a core network. Similarly, 'downstream node' or 'downstream wireless communications device' is used to refer to a relay node or other communications device (such as a terminal device or UE) from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111. Considering a route comprising a sequence of nodes, a node in the route may be referred to as a 'parent node' of another node in the route which is downstream of the 'parent node' and is an adjacent node to the 'parent node' in the route. Similarly, a node in the route may be referred to as a 'child node' of another node in the route which is upstream of the 'child node' and is adjacent to the 'child node' in the route. More than one route may be used for the transmission of the uplink data from a given terminal device; this is referred to herein as 'multi-connectivity'. For example, the uplink data transmitted by the terminal device 104 may be transmitted either via the Node 3 113 and the Node 2 112 to the donor node 110, or via the Node 3 113 and the Node 1 111 to the donor node 110.

In the following description, example embodiments are described in which each of the nodes is an infrastructure equipment; the present disclosure is not so limited. A node may comprise at least a transmitter, a receiver and a controller. In some embodiments of the present technique, the functionality of a node (other than the donor node) may be carried out by a terminal device, which may be the terminal device 4 (of FIG. 1) or 14 (of FIG. 2), adapted accordingly. As such, in some embodiments of the present technique, a route may comprise one or more terminal devices. In other embodiments, a route may consist of only a plurality of infrastructure equipment.

In some embodiments of the present technique, an infrastructure equipment acting as a node may not provide a wireless access interface for the transmission of data to or by a terminal device other than as part of an intermediate transmission along a route.

In some embodiments of the present technique, a route is defined considering a terminal device (such as the terminal device 104) as the start of a route. In other embodiments a route is considered to start at an infrastructure equipment which provides a wireless access interface for the transmission of the uplink data by a terminal device.

In order for data to be transmitted to or from terminal devices which are in cells generated by infrastructure equipment which do not have a dedicated backhaul connection to the core network part, the data must be transmitted to the core network via a wireless backhaul provided by one or more infrastructure equipment acting as a backhaul relay. Downlink data from the core network for the terminal devices must also be transmitted via the wireless backhaul. A communications link forming the wireless backhaul may share communications resources with a wireless access interface used in a cell and/or with other communication links forming the wireless backhaul.

To enable the transmission of the uplink data and the downlink data via a wireless backhaul, there is thus a need for communications resources to be allocated for the transmission of the data from one node to another.

In order to meet the data communications requirements of the terminal devices efficiently, there is a need to provide efficient and low latency data transmission via the wireless backhaul, while scheduling the use of the communications resources in a manner that does not conflict with the capabilities of infrastructure equipment acting as a backhaul relay node, in particular with respect to the possibility of transmitting and/or receiving data to or from two different infrastructure equipment or terminal devices using the same resource elements (e.g. characterised by time and frequency) of a wireless access interface.

According to example embodiments of the present technique, there is therefore provided a method of operating a first infrastructure equipment of a wireless communications network, the wireless communications network comprising a core network part, a backhaul relay node comprising the first infrastructure equipment, an upstream relay node comprising a second infrastructure equipment, the upstream relay node providing a backhaul relay between the first infrastructure equipment and the core network part, and a downstream wireless device.

The method comprises receiving from the upstream relay node an indication of a first set of communications resources, the first set of communications resources comprising one or more resource elements of a carrier within a first time period, in response to receiving the indication of the first set of communications resources, allocating a portion of the first set of communications resources for receiving first data for transmission to the core network part from the downstream wireless communications device, and receiving second data transmitted by the upstream relay node on one or more resource elements within a second set of communications resources of the carrier within the first time period, the second set of communications resources different from the first set of communications resources.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications link. For example, FIG. 4 illustrates four inter-node wireless communications links 130, 132, 134, 136, which include a first inter-node wireless communications link 130 used for communications between the donor node 110 and the Node 1 111, and a second inter-node wireless communications link 136 used for communications between the Node 1 111 and the Node 3 113.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some embodiments, all of the inter-node wireless communications links 130, 132, 134, 136 are provided by a shared wireless access interface.

A wireless access interface which provides an inter-node wireless communications link may also be used for communications between an infrastructure equipment (which may be a node) and a terminal device which is served by the infrastructure equipment. For example, the terminal device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some embodiments, a wireless access interface used for the transmission of data from one node to another uses a first technique and a wireless access interface used for the transmission of data between an infrastructure equipment acting as a node and a terminal device may use a second technique different from the first. In some embodiments, the wireless access interface(s) used for the transmission of data from one node to another and the wireless access interface(s) used for the transmission of data between an infrastructure equipment and a terminal device use the same technique.

Examples of wireless access interface standards include the third generation partnership project (3GPP)-specified general packet radio service (GPRS)/enhanced data rates for global system for mobile communications (GSM) evolution (EDGE) ("2G"), wideband code division multiple access (WCDMA) universal mobile telecommunications system (UMTS) and related standards such as HSPA (high speed packet access) and HSPA+ ("3G"), LTE (long term evolution) and related standards including LTE-A ("4G"), and new radio access technology (NR) ("5G"). Techniques that may be used to provide a wireless access interface include one or more of time division multiple access (TDMA), frequency division multiple access FDMA, orthogonal frequency division multiple access OFDMA, single carrier frequency division multiple access SC-FDMA, code division multiple access CDMA. Duplexing (i.e. the transmission over a wireless link in two directions) may be by means of frequency division duplexing (FDD) or time division duplexing (TDD) or a combination of both.

In some embodiments of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

As described above in respect of FIG. 3, a physical interface 46 may connect a DU 41 and a CU 40. In some embodiments, one DU 41 may be associated with the donor node 110, and a different DU 41 may be associated with another infrastructure equipment, such as for example the Node 1 111. In such embodiments, a logical F1 connection may be realised between a CU 40 associated with an donor node and a DU 41 associated with the Node 1 111 by means of a combination of the physical interface 46 connecting the CU 40 to the DU 41 associated with the donor node 110, the interface 16 connecting the DU 41 associated with the donor node 110 with the TRP 10 associated with the donor node 110, and one or more of the inter-node wireless communications links 130, 132, 134, 136.

A wireless access interface may provide communications resources which can be allocated by any appropriate method to an individual transmission or a group of transmissions. For example, the communications resources may be characterised by one or more of a time period, a range of frequencies, a MIMO (Multi-Input Multi-Output) layer, an RS (Reference Signal) port, a transmission beam and a code sequence. Generally, transmissions using communications resources which are mutually orthogonal may be successfully distinguished from each other by appropriate signal processing techniques at the receiving entity.

A communications resource allocation may therefore comprise a set of communications resources for a particular purpose. The communications resource allocation may be characterised in any manner appropriate to the technology and/or standard used for the corresponding wireless access interface. For example, a communications resource allocation in an OFDM-based wireless access interface may comprise one or more resource elements, each characterised by a time period (which may be expressed in terms of OFDM symbols) and one or more sub-carriers in the frequency domain.

A communications resource allocation may comprise a periodic repetition. For example, an allocation may comprise a set of sub-carriers for the duration of a slot (or some portion thereof), in each slot N where N mod Tperiod=A, where Tperiod is the periodicity of the allocation and A is an offset value. The number of repetitions or the duration for which the allocation remains valid may be limited.

As described above, in some embodiments, there may be multiple routes from an infrastructure equipment to the donor node 110. For example, in FIG. 4, the Node 3 113 may transmit the uplink data to the donor node 111 via either, or both of, the Node 1 111 and the Node 2 112. In such circumstances, the Node 3 113 may receive communications resource allocations from either or both of the Node 1 111 and the Node 2 112.

Figure 5:
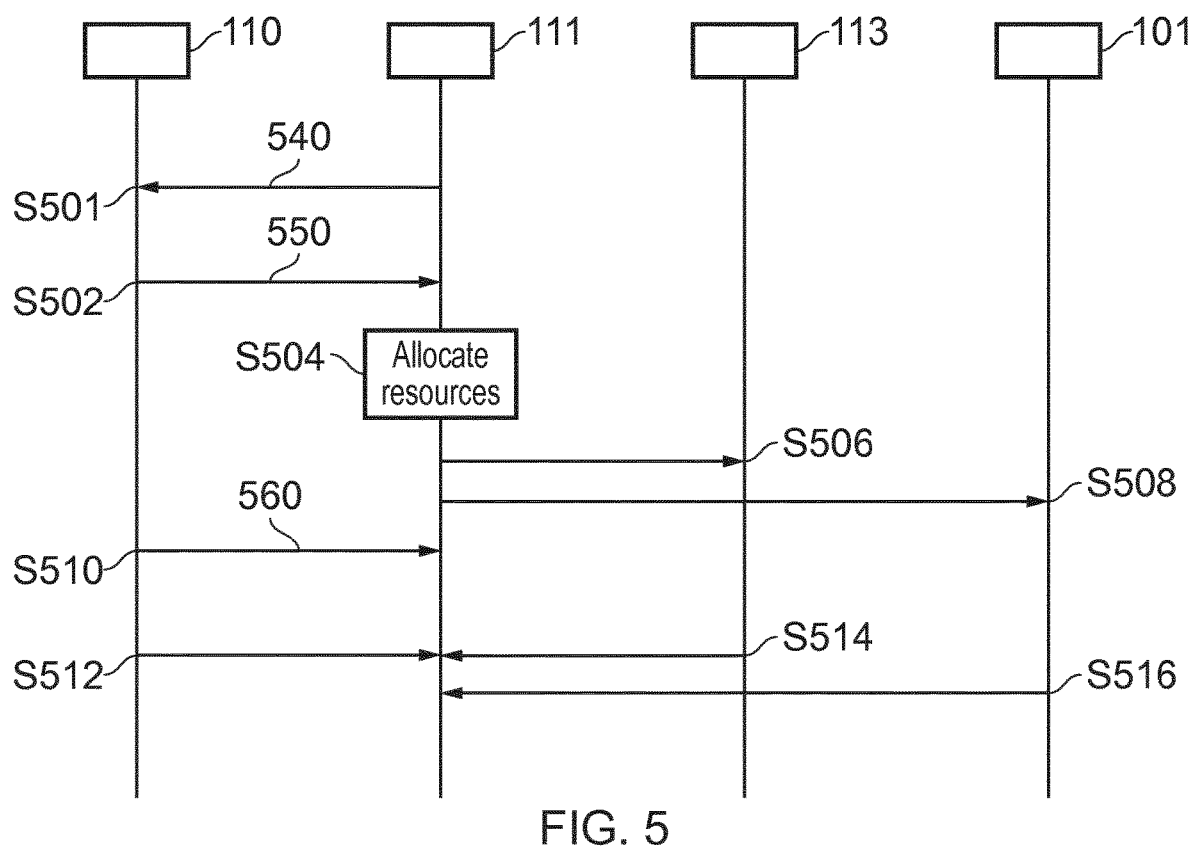
FIG. 5 illustrates a message sequence chart showing communications in a wireless communications network in accordance with embodiments of the present disclosure.

FIG. 5 illustrates a message sequence chart showing transmissions in accordance with embodiments of the present technique for the transmission of uplink data and downlink data.

FIG. 5 shows the donor node 110, the Node 1 111, the Node 3 113 and the first UE 101. As described above, the donor node 110 is an infrastructure equipment acting as a backhaul relay node between the Node 1 111 and the core network part 20 and acting as a parent node with respect to the Node 1 111. The Node 1 111 may be an infrastructure equipment acting as a child node (with respect to the donor node 110).

Node 1 111 is also acting as a parent node with respect to the Node 3 113 and the first UE 101. Similarly, the Node 3 113 and the first UE 101 are child nodes of the Node 1 111. The Node 3 113 and the first UE 101 may be referred to as downstream wireless communications devices with respect to the Node 1 111 or the Node 2 112, acting as relay nodes.

However, it will be appreciated that the embodiments of the present technique are not limited to the particular topology, and in particular may apply to other arrangements where the parent node with respect to the Node 1 111 is a backhaul relay node which is not a donor node. Similarly, with respect to the Node 1 111, there may be one or more downstream wireless communications devices; these may comprise infrastructure equipment or terminal devices or both.

The donor node 110 communicates with the Node 1 111 via the first inter-node wireless communications link 130; the Node 1 111 communicates with the Node 3 113 via the second inter-node wireless communications link 136 and with the first UE 101 via a wireless access interface which may comprise communications resources which are common to one or more of the first and second inter-node wireless communication links 130, 136. In some embodiments of the present technique, the first and second inter-node wireless communication links 130, 136 and the wireless access interface used by the first UE 101 comprise communications resources within a single frequency resource. A frequency resource may be a contiguous range of carrier frequencies such as a single carrier, component carrier or a bandwidth part (BWP).

As shown in FIG. 4, the second UE 102 may also be a child node of the Node 1 111, however for conciseness it is not shown in the topology of FIG. 5. For example, the UE 102 may be in an idle mode and have no upstream data to transmit or downstream data to receive.

The process starts at step S501, in which the Node 1 111 acting as a child node of the donor node 110, transmits a simultaneous receive capability indication 540 to the donor node 110. The simultaneous receive capability indication 540 indicates that the Node 1 111 is capable of simultaneously receiving transmissions from both its child node (such as the Node 3 113 and/or the first UE 101) and from its parent node (i.e. the donor node 110).

Figure 6:
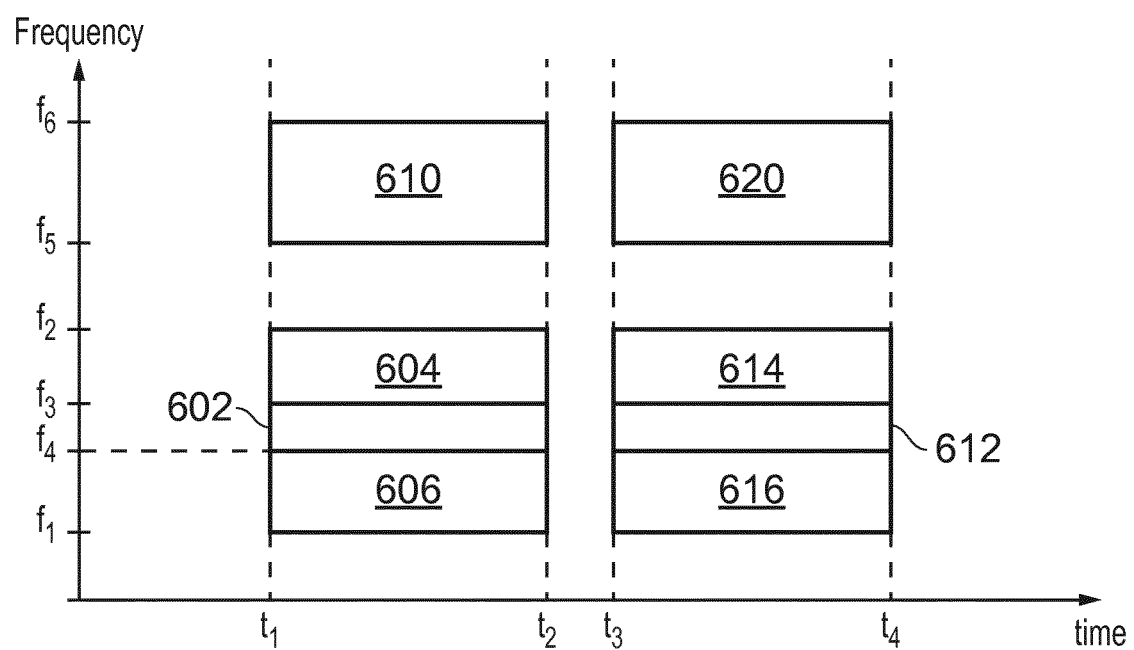
FIG. 6 illustrates graphically communications resource allocations according to an example of the present technique.

In step S502, the donor node 110, acting as the parent node of the Node 1 111, transmits a child resource indication 550 to the Node 1 111. The child resource indication 550 indicates communications resources which the Node 1 111 may allocate for the reception of uplink data transmitted by its child nodes. The child resource indication 550 indicates communications resources within a first time period. For example, the child resource indication 550 may indicate the child communications resources 602 bounded by a time t1 and a time t2 (the first time period corresponding to the time interval from time t1 to time t2) and bounded by frequencies f1 and f2, as illustrated in FIG. 6, the child communications resources 602 being those resources which the Node 1 may allocate for the transmission of uplink data from one or more child nodes to the Node 1 111. The child resource indication 550 may contain an explicit description of the child communications resources 602 (e.g. by reference to the resources bounded by times t1 and t2, and by the frequencies f1 and f2). However, the child resource indication 550 may alternatively indicate the child communications resources 602 in any appropriate manner, for example, by describing resources which do not form the child communications resources 602 (for example, by reference to resources prior to time t1 and after time t2 or which are at frequencies below frequency f1 or above frequency f2).

At step S504, the Node 1 111 allocates one or more portions of the child communications resources 602 for the transmission of uplink data from one or more child nodes to the Node 1 111. For example, the Node 1 111 may allocate a first portion 604, comprising resource elements bounded by times t1 and t2, and by frequencies f3 and f2 shown in FIG. 6, for the transmission of uplink data from the Node 3 113 to the Node 1 111. Similarly, the Node 1 111 may allocate a second portion 606, comprising resource elements bounded by times t1 and t2, and by frequencies f4 and f1 shown in FIG. 6, for the transmission of uplink data from the first UE 101 to the Node 1 111.

At steps S506 and S508, the Node 1 111 transmits an indication of the allocation of the first portion and an indication of the allocation of the second portion to, respectively, the Node 3 113 and the first UE 101.

At step S510, the Node 1 111 receives an parent resource indication 560 indicating an allocation of parent communications resources which the donor node 110 has allocated for the transmission of downlink data, to be received by the Node 1 111.

The parent resource indication 560 indicates parent communications resources within the first time period. For example, the parent resource indication 560 may indicate the parent communications resources 610 bounded by the time t1 and the time t2 and bounded by frequencies f5 and f6, as illustrated in FIG. 6. The parent communications resources 610 and the child communications resources 602 may comprise resource elements of the same frequency resource.

Accordingly, during the time period from t1 to t2, steps S512, S514 and S516 occur, by which the Node 1 111 receives, respectively, downlink data transmitted by the donor node 110 using the parent communications resources 610, uplink data transmitted by the Node 3 113 using the first portion of the child communications resources 604, and uplink data transmitted by the first UE 101 using the second portion of the child communications resources 606.

In accordance with embodiments of the present technique, therefore, within the first time period, there are allocated resources for the use of the Node 1 111. These resources comprise parent communications resources 610 and child communications resources 602. Both the parent communications resources 610 and child communications resources 602 are resources which are for the transmission of data which the Node 1 111 is to receive. As such, there is no requirement for the Node 1 111 to simultaneously receive and transmit within the time period t1-t2; however, uplink data and downlink data may be simultaneously transmitted.

Furthermore, because the child communications resources 602 and the parent communications resources 610 may not overlap, the transmission of the uplink data by the Node 3 113 (at step S514) and by the first UE 101 (at step S516) does not result in interference to the transmission of the downlink data by the donor node 110 (at step S512), and vice versa, even if the child communications resources 602 and the second parent communications resources 610 comprise resource elements of the same frequency resource.

Figure 7:
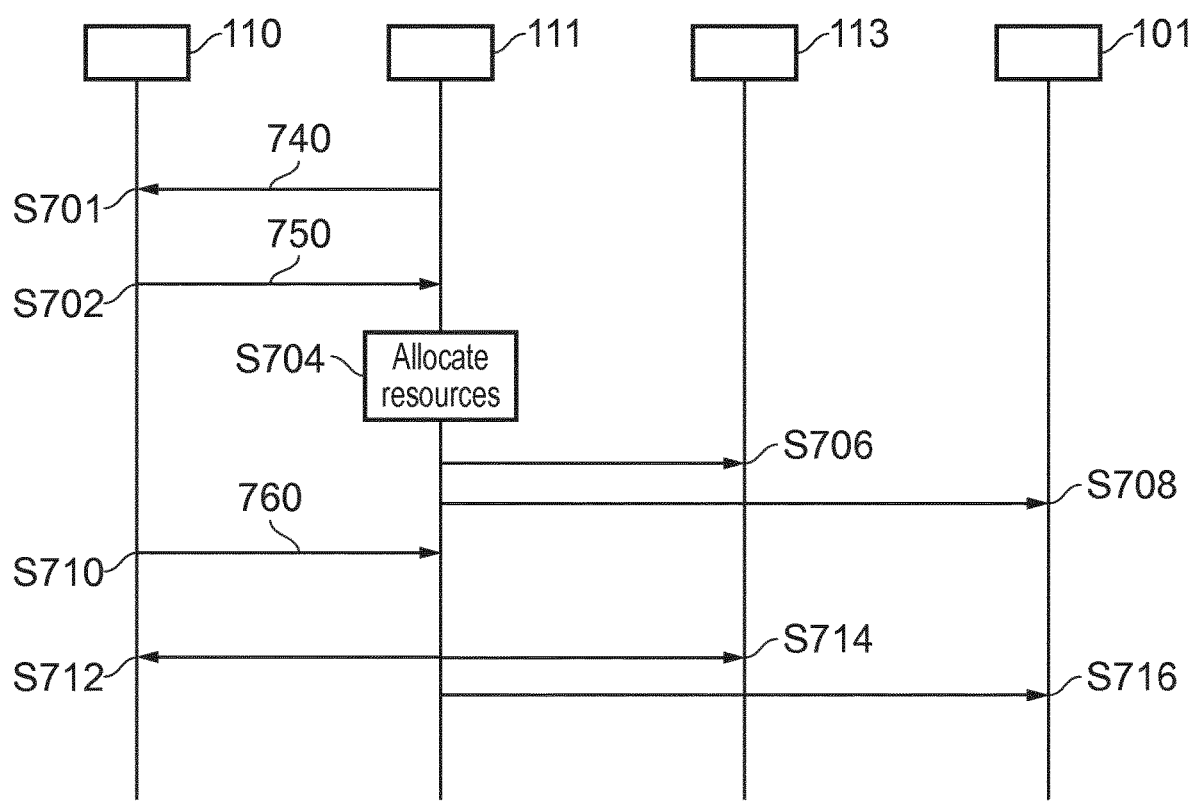
FIG. 7 illustrates a message sequence chart showing communications in a wireless communications network in accordance with embodiments of the present disclosure.

FIG. 7 illustrates a message sequence chart showing transmissions in accordance with embodiments of the present technique for the transmission of uplink data and downlink data.

FIG. 7 shows the donor node 110, the Node 1 111 the Node 3 113 and the first UE 101 as described above in respect of FIG. 5. However, it will be appreciated that the embodiments of the present technique are not limited to the particular topology.

The process starts at step S701, in which the Node 1 111 acting as a child node of the donor node 110, transmits a simultaneous transmit capability indication 740 to the donor node 110. The simultaneous transmit capability indication 740 indicates that the Node 1 111 is capable of simultaneously transmitting transmissions to both its child node(s) (such as the Node 3 113 and the first UE 101) and to its parent node (i.e. the donor node 110).

In step S702, the donor node 110, acting as the parent node of the Node 1 111, transmits a second child resource indication 750 to the Node 1 111. The second child resource indication 750 indicates communications resources which the Node 1 111 may allocate for the transmission of downlink data to its child nodes. The second child resource indication 750 indicates communications resources within a second time period. For example, the second child resource indication 750 may indicate the second child communications resources 612 bounded by a time t3 and a time t4 (the second time period corresponding to the time interval from time t3 to time t4) and bounded by frequencies f1 and f2, as illustrated in FIG. 6, the second child communications resources 612 being those resources which the Node 1 may allocate for the transmission of uplink data to one or more child nodes by the Node 1 111. The second child resource indication 750 may contain an explicit description of the second child communications resources 612 or may alternatively indicate the second child communications resources 612 in any appropriate manner, for example, by describing resources which do not form the second child communications resources 612.

At step S704, the Node 1 111 allocates one or more portions of the second child communications resources 612 for the transmission of downlink data by the Node 1 111 to one or more of its child nodes. For example, the Node 1 111 may allocate a third portion 614, comprising resource elements bounded by times t3 and t4, and by frequencies f3 and f2 shown in FIG. 6, for the transmission of downlink data from the Node 1 111 to the Node 3 113. Similarly, the Node 1 111 may allocate a fourth portion 616, comprising resource elements bounded by times t3 and t4 and by frequencies f4 and f1 shown in FIG. 6, for the transmission of downlink data from the Node 1 111 to the first UE 101.

At steps S706 and S708, the Node 1 111 transmits an indication of the allocation of the third portion and an indication of the allocation of the fourth portion to, respectively, the Node 3 113 and the first UE 101.

At step S710, the Node 1 111 receives a second parent resource indication 760 indicating an allocation of parent communications resources which the donor node 110 has allocated for the transmission of uplink data by the Node 1 111 to the donor node 110.

The second parent resource indication 760 indicates second parent communications resources within the second time period. For example, the second parent resource indication 760 may indicate the second parent communications resources 620 bounded by the time t3 and the time t4 and bounded by frequencies f5 and f6, as illustrated in FIG. 6. The second parent communications resources 620 and the second child communications resources 612 may comprise resource elements of the same frequency resource (e.g. same component carrier), and may comprise resource elements of the same frequency resource (e.g. component carrier) as the frequency resource associated with the child communications resources 602 and the parent communications resources 610.

Accordingly, during the second time period from t3 to t4, steps S712, S714 and S716 occur, by which the Node 1 111 transmits, respectively, uplink data to the donor node 110 using the second parent communications resources 620, downlink data transmitted to the Node 3 113 using the third portion of the second child communications resources 614, and downlink data transmitted to the first UE 101 using the fourth portion of the second child communications resources 616.

In accordance with embodiments of the present technique, therefore, within the second time period, there are allocated resources for the use of the Node 1 111. These resources comprise second parent communications resources 620 and the second child communications resources 612. Both the second parent communications resources 610 and the second child communications resources 612 are resources which are for the transmission of data by the Node 1 111. As such, there is no requirement for the Node 1 111 to simultaneously receive and transmit within the second time period t3-t4; however, uplink data and downlink data may be simultaneously transmitted.

Furthermore, because the second child communications resources 612 and the second parent communications resources 620 do not overlap, the transmission of the downlink data by the Node 1 111 (at steps S714 and S716) does not result in interference to the transmission of the uplink data by the Node 1 111 (at step S712), and vice versa, even if the second child communications resources 612 and the second parent communications resources 620 comprise resource elements of the same frequency resource.

The steps in FIG. 5 and FIG. 7 may be performed in an order different from that shown above. For example, steps S506, S508, and S510 may occur in any relative sequence; similarly, steps S706, S708 and S710 may occur in an order different from that shown. In some embodiments, one or more steps may be omitted; for example, one or more of the steps S701 and S501 may be omitted.

In some embodiments, the processes described above and illustrated in FIG. 5 and FIG. 7 may be combined. For example, steps S502 and S702 may be combined, for example, where child communications resources for uplink transfer (i.e. where the child node receives data transmissions from its child node(s)) and for downlink transfer (i.e. where the child node transmits data to its child node(s)) are configured by means of a single RRC configuration. In some embodiments, the steps S701 and S501 may be combined and a single capability indicator, comprising the simultaneous transmit capability indication 740 and the simultaneous receive capability indication 540 may be transmitted to the donor node 110.

Although t2 and t3 of FIG. 6 are shown as separated in time, the present disclosure is not so limited; in some embodiments, for example, t2 and t3 may be substantially the same, or may be separated by a minimum time period required for the transceiver of the Node 1 111 to be reconfigured from a receive mode to a transmit mode.

Similarly, although the child communications resources are shown as bounded by frequencies f1 and f2 for both the first and second time periods and the parent communications resources are shown as bounded by frequencies f5 and f6 for both the first and second time periods, the disclosure is not so limited.

In some embodiments of the present technique, the parent communications resources comprise resources within a time period which is a portion of the time period associated with the child communications resources.

The child communications resources may be configured by a node acting as a parent node (which may be the donor node 110 in the examples of FIG. 5 and FIG. 7) in a semi-static manner. For example, the child communications resources may comprise periodically repeating resources. The semi-statically configured child communications resources may repeat indefinitely until the child communications resources are explicitly released or otherwise modified.

The child communications resources may be configured (i.e. allocated, modified, or released) by means of radio resource control (RRC) signalling. In addition, a child communications resources set, comprising a plurality of child communications resources, may be configured by means of RRC signalling.

One of the child communications resources within the child communications resources set may be allocated (or in other words, activated) by means of a transmission of downlink control information (DCI), which may be transmitted on a physical downlink control channel (PDCCH). The DCI may be transmitted for the purpose of indicating the one of the child communications resources from the configured child communications resources set.

In some embodiments, a PDCCH may be used by an infrastructure equipment acting as a relay node to schedule transmissions to its child node(s) or by its child node(s) to the infrastructure equipment acting as a relay node. The PDCCH used for scheduling transmissions to or from a child node may differ from a PDCCH used by a parent node to indicate child communications resources; for example, they may differ in a format of the DCI and/or in a radio network temporary identifier (RNTI) indicated (e.g. by means of a scrambling of a cyclic redundancy check portion) in the DCI.

The RNTI and/or DCI format associated with one or both of the PDCCHs may be configured by the parent node and indicated to the child node (e.g. by means of the parent node transmitting RRC signalling).

A slot format indication (SFI) may be transmitted by an infrastructure equipment on a group common PDCCH and may indicate, for each OFDM symbol, whether that symbol is allocated for transmission (downlink resource) or reception (uplink resource) by the infrastructure equipment. An SFI may alternatively indicate that an OFDM symbol is a flexible resource.

In some embodiments of the present technique, the child communications resources are indicated by an infrastructure equipment acting as a parent node by means of one or more slot format indications (SFI).

The infrastructure equipment acting as a parent node may indicate (for example, at step S550 of FIG. 5 or at step S750 of FIG. 7) that one or more OFDM symbols are child communications resources by indicating using corresponding SFI transmissions that the one or more OFDM symbols making up the child communications resources are flexible resources.

An infrastructure equipment acting as a child node may determine that the child communications resources include an OFDM symbol which may be allocated for transmission or reception by the infrastructure equipment acting as the child node, if the OFDM symbol is indicated by means of an SFI transmission by the infrastructure equipment acting as the parent node as being a flexible resource.

In some embodiments, one or more symbols may be configured (e.g. by means of RRC signalling) as being potential child communications resources. These symbols may be further configured as potential child communications resources for reception of data by the infrastructure equipment acting as a child node or as potential child communications resources for transmission of data by the infrastructure equipment acting as a child node. Subsequent to the configuration, an SFI transmission by the infrastructure equipment acting as the parent node may indicate (e.g. by means of an SFI indication corresponding to a flexible resource indication), in respect of an OFDM symbol within the potential child communications resources, that the child communications resources include the OFDM symbol associated with the SFI transmission, in accordance with the configuration. Accordingly, the infrastructure equipment acting as a child node may receive an indication of the configuration, receive the SFI indication, and based on the SFI indication and the configuration, determine that the child communications resources include the OFDM symbol, and that the OFDM symbol may be scheduled for transmission or reception of data by the infrastructure equipment acting as a child node, as the case may be.

In some embodiments, the infrastructure equipment acting as a child node may determine that the child communications resources include the OFDM symbol, and that the OFDM symbol may be allocated for reception by the infrastructure equipment acting as the child node, if the OFDM symbol is indicated by means of the SFI transmission by the infrastructure equipment acting as the parent node as being a downlink resource.

In some embodiments, the infrastructure equipment acting as a child node may determine that the child communications resources include the OFDM symbol, and that the OFDM symbol may be allocated for transmission by the infrastructure equipment acting as the child node, if the OFDM symbol is indicated by means of the SFI transmission by an infrastructure equipment acting as the parent node as being a uplink resource.

In some embodiments, a PDCCH may be used by an infrastructure equipment acting as a relay node to schedule transmissions to its child node(s) or by its child node(s) to the infrastructure equipment acting as a relay node.

In accordance with embodiments of the present application, the infrastructure equipment acting as the parent node, having indicated communications resources during a time period which are available for the child node to allocate for transmissions by the infrastructure equipment acting as a child node to its child nodes, may refrain from allocating resources during the same time period for the infrastructure equipment acting as the child node to receive data transmitted by the infrastructure equipment acting as the parent node. The infrastructure equipment acting as the parent node may, however, allocate non-overlapping resources during the same time period for the infrastructure equipment acting as the child node to transmit data to the infrastructure equipment acting as the parent node.

Similarly, in accordance with embodiments of the present application, the parent node, having indicated communications resources during a time period which are available for the child node to allocate for transmissions by child nodes of the child node to the child node, may refrain from allocating resources during the same time period for the child node to transmit data to the parent node. The parent node may, however, allocate non-overlapping resources during the same time period for the parent node to transmit data to the child node.

In some embodiments of the present technique, an infrastructure equipment acting as a parent node (such as the donor node 110) which indicates that child communications resources within a time period (such as the first time period t1-t2) are available for a child node (such as the Node 1 111) to allocate for transmissions by child nodes of the child node (such as the Node 3 113 and the first UE 101) to the child node (Node 1 111), may also allocate resources during the same time period for the child node (Node 1 111) to receive data from the parent node (i.e. the donor node 110). In some embodiments, this may be in response to receiving, from the Node 1 111 a simultaneous receive capability indication, which indicates that the Node 1 111 is capable of simultaneously receiving transmissions from both its child node (such as the Node 3 113 and the first UE 101) and from its parent node (i.e. the donor node 110).

If the donor node 110 does not receive the simultaneous receive capability indication (or receives an indication that the Node 1 111 is not capable of simultaneously receiving transmissions from both its child node and from its parent node), it may refrain from allocating resources for the child node (i.e. the Node 1 111) to receive data from the parent node during the time period in which the child communications resources have been allocated.

In some embodiments of the present technique, a parent node (such as the donor node 110) which indicates that child communications resources within a time period (such as the second time period t3-t4) are available for a child node (such as the Node 1 111) to allocate for transmissions to child nodes of the child node (such as the Node 3 113 and the first UE 101), may also allocate resources during the same time period for the child node (Node 1 111) to transmit data to the parent node (i.e. the donor node 110). In some embodiments, this may be in response to receiving, from the Node 1 111 a simultaneous transmission capability indication which indicates that the Node 1 111 is capable of simultaneously transmitting both to its child node(s) (such as the Node 3 113 and the first UE 101) and to its parent node (i.e. the donor node 110).

If the donor node 110 does not receive a simultaneous transmission capability indication (or receives an indication that the Node 1 111 is not capable of simultaneously transmitting both to its child node(s) and to its parent node), it may refrain from allocating resources for the child node (i.e. the Node 1 111) to transmit data to the donor node 110 during the second time period in which the child communications resources have been allocated.

There has thus been described a method of operating a first infrastructure equipment of a wireless communications network, the wireless communications network comprising a core network part, the first infrastructure equipment, a second infrastructure equipment acting as a backhaul relay node between the first infrastructure equipment and the core network part, and a downstream wireless communications device.

The method comprising receiving from the second infrastructure equipment an indication of a first set of communications resources, the first set of communications resources comprising one or more resource elements of a first carrier within a first time period, in response to receiving the indication of the first set of communications resources, allocating resource elements of the first set of communications resources for receiving first data for transmission to the core network part from the downstream wireless communications device, and receiving second data transmitted by the second infrastructure equipment on one or more resource elements within a second set of communications resources of the first carrier within the first time period, the second set of communications resources different from the first set of communications resources.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The following numbered paragraphs provide further example aspects and features of the present technique:

Paragraph 1. A method of operating a first infrastructure equipment of a wireless communications network, the wireless communications network comprising a core network part, the first infrastructure equipment, a second infrastructure equipment acting as a backhaul relay node between the first infrastructure equipment and the core network part, and a downstream wireless communications device, the method comprising: receiving from the second infrastructure equipment an indication of a first set of communications resources, the first set of communications resources comprising one or more resource elements of a first frequency resource within a first time period, in response to receiving the indication of the first set of communications resources, allocating resource elements of the first set of communications resources for receiving first data for transmission to the core network part from the downstream wireless communications device, and receiving second data transmitted by the second infrastructure equipment on one or more resource elements within a second set of communications resources of the first frequency resource within the first time period, the second set of communications resources different from the first set of communications resources.

Paragraph 2. A method according Paragraph 1, wherein the downstream wireless communications device is a third infrastructure equipment and the first infrastructure equipment is acting as a second backhaul relay node between the second infrastructure equipment and the third infrastructure equipment.

Paragraph 3. A method according to Paragraph 1 or Paragraph 2, the method comprising: transmitting the first data to the second infrastructure equipment, and transmitting the second data to the downstream wireless communications device.

Paragraph 4. A method according to any of Paragraphs 1 to 3, wherein the second infrastructure equipment is connected to the core network part of the wireless communications network and is acting as a donor node.

Paragraph 5. A method according to any of Paragraphs 1 to 4, the method comprising before receiving the second data from the second infrastructure equipment, receiving an indication that the second set of communications resources has been allocated for the transmission of the second data by the second infrastructure equipment to the first infrastructure equipment.

Paragraph 6. A method according to any of Paragraphs 1 to 5, the method comprising: receiving, from the second infrastructure equipment, an indication that the first set of communications resources are for allocation for a reception of data by the first infrastructure equipment.

Paragraph 7. A method according to Paragraph 6, wherein the indication that the first set of communications resources are for the allocation for the reception of the data by the first infrastructure equipment comprises an indication that no communications resources on the first frequency resource within the first time period are for allocation for the transmission of the data by the first infrastructure equipment.

Paragraph 8. A method according to any of Paragraphs 1 to 7, wherein receiving the indication of the first set of communications resources comprises receiving one or more slot format indications associated with the first set of communications resources indicating that the first set of communications resources are not allocated for a transmission of data by the second infrastructure equipment to the first infrastructure equipment and the first set of communications resources are not allocated for a transmission of data by the first infrastructure equipment to the second infrastructure equipment.

Paragraph 9. A method according to any of Paragraphs 1 to 8, wherein the allocating the resource elements of the first set of communications resources comprises transmitting one or more slot format indications associated with the allocated resource elements of the first set of communications resources, the one or more slot format indications indicating that the allocated resource elements of the first set of communications resources are allocated for the transmission of the first data by the downstream wireless communications device to the first infrastructure equipment.

Paragraph 10. A method according to any of Paragraphs 1 to 9, the method comprising: transmitting to the second infrastructure equipment an indication that the first infrastructure equipment supports simultaneous reception of the second data transmitted by the second infrastructure equipment and reception of the first data transmitted by the downstream wireless communications device.

Paragraph 11. A method according to any of Paragraphs 1 to 10, the method comprising: receiving from the second infrastructure equipment an indication of a third set of communications resources, the third set of communications resources comprising one or more resource elements of a second frequency resource within a second time period, in response to receiving the indication of the third set of communications resources, allocating resource elements of the third set of communications resources for transmitting third data from the core network part by the first infrastructure equipment to the downstream wireless communications device, and transmitting fourth to the second infrastructure equipment on one or more resource elements within a fourth set of communications resources of the second frequency resource within the second time period, the fourth set of communications resources different from the third set of communications resources.

Paragraph 12. A method according to Paragraph 11, the method comprising: transmitting to the second infrastructure equipment an indication that the first infrastructure equipment supports simultaneous transmission of data to the second infrastructure equipment and transmission of data to the downstream wireless communications device.

Paragraph 13. A method according to Paragraph 11 or Paragraph 12, wherein the first frequency resource and the second frequency resource are the same.

Paragraph 14. A method of operating a first infrastructure equipment of a wireless communications network, the wireless communications network comprising a core network part, a second infrastructure equipment, the first infrastructure equipment acting as a backhaul relay node between the second infrastructure equipment and the core network part, and a downstream wireless communications device, the method comprising: transmitting to the second infrastructure equipment an indication of a first set of communications resources, the first set of communications resources comprising one or more resource elements of a first frequency resource within a first time period, the first set of communications resources being available for allocating by the second infrastructure equipment for a transmission of first data from a downstream wireless communications device different from the first infrastructure equipment to the second infrastructure equipment, for transmission to the core network part, and transmitting second data to the second infrastructure equipment on one or more resource elements of the first frequency resource within a second set of communications resources within the first time period, the second set of communications resources different from the first set of communications resources.

Paragraph 15. A method according Paragraph 14, wherein the downstream wireless communications device is a third infrastructure equipment and the first infrastructure equipment is acting as a second backhaul relay node between the second infrastructure equipment and the third infrastructure equipment.

Paragraph 16. A method according to Paragraph 14 or Paragraph 15, the method comprising: receiving the first data from the second infrastructure equipment.

Paragraph 17. A method according to any of Paragraphs 14 to 16, wherein the first infrastructure equipment is connected to the core network part of the wireless communications network and is acting as a donor node.

Paragraph 18. A method according to any of Paragraphs 14 to 17, the method comprising before transmitting the second data to the second infrastructure equipment, transmitting an indication that the second set of communications resources has been allocated for the transmission of the second data by the first infrastructure equipment to the second infrastructure equipment.

Paragraph 19. A method according to any of Paragraphs 14 to 18, the method comprising: transmitting to the second infrastructure equipment an indication that the first set of communications resources are for allocation for a reception of data by the first infrastructure equipment.

Paragraph 20. A method according to Paragraph 19, wherein the indication that the first set of communications resources are for the allocation for the reception of the data by the second infrastructure equipment comprises an indication that no communications resources on the first frequency resource within the first time period are for allocation for the transmission of the data by the first infrastructure equipment.

Paragraph 21. A method according to any of Paragraphs 14 to 20, wherein transmitting the indication of the first set of communications resources comprises transmitting one or more slot format indications associated with the first set of communications resources indicating that the first set of communications resources are not allocated for a transmission of data by the first infrastructure equipment to the second infrastructure equipment and the first set of communications resources are not allocated for a transmission of data by the second infrastructure equipment to the first infrastructure equipment.

Paragraph 22. A method according to any of Paragraphs 14 to 21, the method comprising: receiving from the second infrastructure equipment an indication that the second infrastructure equipment supports simultaneous reception of the second data transmitted by the first infrastructure equipment and reception of the first data transmitted by the downstream wireless communications device.

Paragraph 23. A method according to any of Paragraphs 14 to 22, the method comprising: transmitting to the second infrastructure equipment an indication of a third set of communications resources, the third set of communications resources comprising one or more resource elements of a second frequency resource within a second time period, the third set of communications resources being available for allocating by the second infrastructure equipment for a transmission of third data from the core network part by the second infrastructure equipment to a downstream wireless communications device, and receiving fourth data from the second infrastructure equipment on one or more resource elements of the second frequency resource within a fourth set of communications resources within the second time period, the fourth set of communications resources different from the third set of communications resources.

Paragraph 24. A method according to Paragraph 23, the method comprising: receiving from the second infrastructure equipment an indication that the second infrastructure equipment supports simultaneous transmission of data to the first infrastructure equipment and transmission of data to the downstream wireless communications device.

Paragraph 25. A method according to Paragraph 23 or Paragraph 24, wherein the first frequency resource and the second frequency resource are the same.

Paragraph 26. A first infrastructure equipment for operating in a wireless communications network, the wireless communications network comprising a core network part, the first infrastructure equipment, a second infrastructure equipment acting as a backhaul relay node between the first infrastructure equipment and the core network part, and a downstream wireless communications device, the first infrastructure equipment comprising a transmitter for transmitting radio signals via a wireless access interface of a radio access network part of the wireless communications network, a receiver for receiving radio signals transmitted via the wireless access interface of the radio access network part, and a controller configured to control the transmitter and the receiver to receive from the second infrastructure equipment an indication of a first set of communications resources, the first set of communications resources comprising one or more resource elements of a first frequency resource within a first time period, in response to receiving the indication of the first set of communications resources, to allocate resource elements of the first set of communications resources for receiving first data for transmission to the core network part from the downstream wireless communications device, and to receive second data transmitted by the second infrastructure equipment on one or more resource elements within a second set of communications resources of the first frequency resource within the first time period, the second set of communications resources different from the first set of communications resources.

Paragraph 27. Circuitry for a first infrastructure equipment for operating in a wireless communications network, the wireless communications network comprising a core network part, the first infrastructure equipment, a second infrastructure equipment acting as a backhaul relay node between the first infrastructure equipment and the core network part, and a downstream wireless communications device, the circuitry comprising transmitter circuitry for transmitting radio signals via a wireless access interface of a radio access network part of the wireless communications network, receiver circuitry for receiving radio signals transmitted via the wireless access interface of the radio access network part, and controller circuitry configured to control the transmitter circuitry and the receiver circuitry to receive from the second infrastructure equipment an indication of a first set of communications resources, the first set of communications resources comprising one or more resource elements of a first frequency resource within a first time period, in response to receiving the indication of the first set of communications resources, to allocate resource elements of the first set of communications resources for receiving first data for transmission to the core network part from the downstream wireless communications device, and to receive second data transmitted by the second infrastructure equipment on one or more resource elements within a second set of communications resources of the first frequency resource within the first time period, the second set of communications resources different from the first set of communications resources.

Paragraph 28. A first infrastructure equipment for operating in a wireless communications network, the wireless communications network comprising a core network part, a second infrastructure equipment, the first infrastructure equipment acting as a backhaul relay node between the second infrastructure equipment and the core network part, and a downstream wireless communications device, the first infrastructure equipment comprising a transmitter for transmitting radio signals via a wireless access interface of a radio access network part of the wireless communications network, a receiver for receiving radio signals transmitted via the wireless access interface of the radio access network part, and a controller configured to control the transmitter to transmit to the second infrastructure equipment an indication of a first set of communications resources, the first set of communications resources comprising one or more resource elements of a first frequency resource within a first time period, the first set of communications resources being available for allocating by the second infrastructure equipment for a transmission of first data from a downstream wireless communications device different from the first infrastructure equipment to the second infrastructure equipment, for transmission to the core network part, and to transmit second data to the second infrastructure equipment on one or more resource elements of the first frequency resource within a second set of communications resources within the first time period, the second set of communications resources different from the first set of communications resources.

Paragraph 29. Circuitry for a first infrastructure equipment for operating in a wireless communications network, the wireless communications network comprising a core network part, a second infrastructure equipment, the first infrastructure equipment acting as a backhaul relay node between the second infrastructure equipment and the core network part, and a downstream wireless communications device, the circuitry comprising transmitter circuitry for transmitting radio signals via a wireless access interface of a radio access network part of the wireless communications network, receiver circuitry for receiving radio signals transmitted via the wireless access interface of the radio access network part, and controller circuitry configured to control the transmitter circuitry to transmit to the second infrastructure equipment an indication of a first set of communications resources, the first set of communications resources comprising one or more resource elements of a first frequency resource within a first time period, the first set of communications resources being available for allocating by the second infrastructure equipment for a transmission of first data from a downstream wireless communications device different from the first infrastructure equipment to the second infrastructure equipment, for transmission to the core network part, and to transmit second data to the second infrastructure equipment on one or more resource elements of the first frequency resource within a second set of communications resources within the first time period, the second set of communications resources different from the first set of communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009
[2] RP-172834, "Revised WID on New Radio Access Technology," NTT DOCOMO, RAN #78

What is claimed is:

1. A method of operating a first infrastructure equipment of a wireless communications network, the wireless communications network comprising a core network part, the first infrastructure equipment, a second infrastructure equipment acting as a backhaul relay node between the first infrastructure equipment and the core network part, and a downstream wireless communications device downstream of the first infrastructure equipment, the method comprising:
   receiving from the second infrastructure equipment an indication of a first set of communications resources, the first set of communications resources comprising one or more resource elements of a first frequency resource within a first time period,
   in response to receiving the indication of the first set of communications resources from the second infrastructure equipment, allocating, by the first infrastructure equipment, resource elements of the first set of communications resources to receive from the downstream wireless communication device first data for transmission to the core network part, and
   receiving, at the first infrastructure equipment, at a same time as receiving of the first data from the downstream wireless communication device, second data transmitted by the second infrastructure equipment on one or more resource elements within a second set of communications resources of the first frequency resource within the first time period, the second set of communications resources being different from the first set of communications resources and having been allocated by the second infrastructure equipment.

2. A method according to claim 1, wherein the downstream wireless communications device is a third infrastructure equipment and the first infrastructure equipment is acting as a second backhaul relay node between the second infrastructure equipment and the third infrastructure equipment.

3. A method according to claim 1, the method comprising:
transmitting the first data to the second infrastructure equipment, and
transmitting the second data to the downstream wireless communications device.

4. A method according to claim 1, wherein the second infrastructure equipment is connected to the core network part of the wireless communications network and is acting as a donor node.

5. A method according to claim 1, the method comprising:
before receiving the second data from the second infrastructure equipment, receiving an indication that the second set of communications resources has been allocated for the transmission of the second data by the second infrastructure equipment to the first infrastructure equipment.

6. A method according to claim 1, the method comprising:
receiving, from the second infrastructure equipment, an indication that the first set of communications resources are for allocation for a reception of data by the first infrastructure equipment.

7. A method according to claim 6, wherein the indication that the first set of communications resources are for the allocation for the reception of the data by the first infrastructure equipment comprises an indication that no communications resources on the first frequency resource within the first time period are for allocation for the transmission of the data by the first infrastructure equipment.

8. A method according to claim 1, wherein receiving the indication of the first set of communications resources comprises:
receiving one or more slot format indications associated with the first set of communications resources indicating that the first set of communications resources are not allocated for a transmission of data by the second infrastructure equipment to the first infrastructure equipment and the first set of communications resources are not allocated for a transmission of data by the first infrastructure equipment to the second infrastructure equipment.

9. A method according to claim 1, wherein the allocating the resource elements of the first set of communications resources comprises:
transmitting one or more slot format indications associated with the allocated resource elements of the first set of communications resources, the one or more slot format indications indicating that the allocated resource elements of the first set of communications resources are allocated for the transmission of the first data by the downstream wireless communications device to the first infrastructure equipment.

10. A method according to claim 1, the method comprising:
transmitting to the second infrastructure equipment an indication that the first infrastructure equipment supports simultaneous reception of the second data transmitted by the second infrastructure equipment and reception of the first data transmitted by the downstream wireless communications device.

11. A method according to claim 1, the method comprising:
receiving from the second infrastructure equipment an indication of a third set of communications resources, the third set of communications resources comprising one or more resource elements of a second frequency resource within a second time period,
in response to receiving the indication of the third set of communications resources, allocating resource elements of the third set of communications resources for transmitting third data from the core network part by the first infrastructure equipment to the downstream wireless communications device, and
transmitting fourth to the second infrastructure equipment on one or more resource elements within a fourth set of communications resources of the second frequency resource within the second time period, the fourth set of communications resources different from the third set of communications resources.

12. A method of operating a first infrastructure equipment of a wireless communications network, the wireless communications network comprising a core network part, a second infrastructure equipment, the first infrastructure equipment acting as a backhaul relay node between the second infrastructure equipment and the core network part, and a downstream wireless communications device downstream of the second infrastructure equipment, the method comprising:
responsive to transmitting from the second infrastructure equipment to the first infrastructure equipment a first indication that the second infrastructure equipment supports simultaneous reception of second data transmitted by the first infrastructure equipment and reception of first data transmitted by the downstream wireless communications device, transmitting to the second infrastructure equipment a second indication of a first set of communications resources, the first set of communications resources comprising one or more resource elements of a first frequency resource within a first time period, the first set of communications resources being available for allocating by the second infrastructure equipment for a transmission of the first data from the downstream wireless communications device different from the first infrastructure equipment to the second infrastructure equipment, for transmission to the core network part, and
transmitting, at a same time as the transmission of the first data, the second data to the second infrastructure equipment on one or more resource elements of the first frequency resource within a second set of communications resources within the first time period, the second set of communications resources being different from the first set of communications resources and having been allocated by the first infrastructure equipment.

13. A method according to claim 12, wherein the downstream wireless communications device is a third infrastructure equipment and the first infrastructure equipment is acting as a second backhaul relay node between the second infrastructure equipment and the third infrastructure equipment.

14. A method according to claim 12, the method comprising:
receiving the first data from the second infrastructure equipment.

15. A method according to claim 12, wherein the first infrastructure equipment is connected to the core network part of the wireless communications network and is acting as a donor node.

16. A method according to claim 12, the method comprising:

before transmitting the second data to the second infrastructure equipment, transmitting a third indication that the second set of communications resources has been allocated for the transmission of the second data by the first infrastructure equipment to the second infrastructure equipment.

17. A method according to claim 12, the method comprising:
transmitting to the second infrastructure equipment a third indication that the first set of communications resources are for allocation for a reception of data by the first infrastructure equipment.

18. A method according to claim 12, wherein transmitting the second indication of the first set of communications resources comprises:
transmitting one or more slot format indications associated with the first set of communications resources indicating that the first set of communications resources are not allocated for a transmission of data by the first infrastructure equipment to the second infrastructure equipment and the first set of communications resources are not allocated for a transmission of data by the second infrastructure equipment to the first infrastructure equipment.

19. A method according to claim 12, the method comprising:
transmitting to the second infrastructure equipment a third indication of a third set of communications resources, the third set of communications resources comprising one or more resource elements of a second frequency resource within a second time period, the third set of communications resources being available for allocating by the second infrastructure equipment for a transmission of third data from the core network part by the second infrastructure equipment to a downstream wireless communications device, and
receiving fourth data from the second infrastructure equipment on one or more resource elements of the second frequency resource within a fourth set of communications resources within the second time period, the fourth set of communications resources different from the third set of communications resources.

20. A first infrastructure equipment for operating in a wireless communications network, the wireless communications network comprising a core network part, the first infrastructure equipment, a second infrastructure equipment acting as a backhaul relay node between the first infrastructure equipment and the core network part, and a downstream wireless communications device downstream of the first infrastructure equipment, the first infrastructure equipment comprising:
a transmitter to transmit radio signals via a wireless access interface of a radio access network part of the wireless communications network,
a receiver to receive radio signals transmitted via the wireless access interface of the radio access network part, and
a controller to control the transmitter and the receiver
to receive from the second infrastructure equipment an indication of a first set of communications resources, the first set of communications resources comprising one or more resource elements of a first frequency resource within a first time period,
in response to receiving the indication of the first set of communications resources from the second infrastructure equipment, to allocate, by the controller of the first infrastructure equipment, resource elements of the first set of communications resources for the first infrastructure equipment to receive first data during the first time period from the downstream wireless communication device, for transmission of the first data to the core network part, and
to receive, at the first infrastructure equipment, at a same time as the transmission of the first data from the downstream wireless communication device, second data transmitted by the second infrastructure equipment on one or more resource elements within a second set of communications resources of the first frequency resource within the first time period, the second set of communications resources being different from the first set of communications resources and having been allocated by the second infrastructure equipment.

* * * * *